United States Patent
Mackenbach et al.

(10) Patent No.: US 12,287,746 B2
(45) Date of Patent: Apr. 29, 2025

(54) MANAGEMENT OF ENDPOINT DEVICES UTILIZING TAG BRIDGE DEVICES

(71) Applicant: Dell Products L.P., Round Rock, TX (US)

(72) Inventors: Jeroen Diederik Cornelis Antonius Mackenbach, Roosendaal (NL); Pierluca Chiodelli, Ashland, MA (US); Daniel E. Cummins, Hudson, NH (US); Bradley K. Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 18/366,019

(22) Filed: Aug. 7, 2023

(65) Prior Publication Data

US 2025/0053532 A1    Feb. 13, 2025

(51) Int. Cl.
*G06F 13/40* (2006.01)
*G06F 13/38* (2006.01)
*G06K 19/077* (2006.01)

(52) U.S. Cl.
CPC ........ *G06F 13/4027* (2013.01); *G06F 13/385* (2013.01); *G06K 19/07749* (2013.01); *G06F 2213/0042* (2013.01)

(58) Field of Classification Search
CPC .............. G06F 13/4027; G06F 13/385; G06K 19/0774

See application file for complete search history.

(56) References Cited

U.S. PATENT DOCUMENTS

| | | | |
|---|---|---|---|
| 11,556,675 B2* | 1/2023 | Bennison | G06F 21/73 |
| 2007/0285253 A1* | 12/2007 | Sharma | G06K 7/0008 |
| | | | 340/539.1 |
| 2010/0277280 A1* | 11/2010 | Burkart | H04Q 9/00 |
| | | | 340/10.1 |
| 2017/0105129 A1* | 4/2017 | Teplin | G08C 17/02 |

(Continued)

OTHER PUBLICATIONS

E. Macias et al., "NFC Active and Passive Peer-to-peer Communication Using the TRF7970A," Texas Instruments Application Report, SLOA192B, Apr. 2014, Revised Mar. 2019, 33 pages.

(Continued)

*Primary Examiner* — Phong H Dang
(74) *Attorney, Agent, or Firm* — Ryan, Mason & Lewis, LLP

(57) ABSTRACT

An apparatus comprises a processing device comprising a processor coupled to a memory. The processing device is configured to receive, over a first communication channel from an orchestrator entity, at least one command specifying one or more actions to take involving an endpoint device, the one or more actions comprising at least one of writing data to a tag of a tag bridge device and reading data from the tag of the tag bridge device. The processing device is further configured to relay the at least one command to the tag of the tag bridge device over a second communication channel, the second communication channel being established between a tag interface of the processing device and the tag bridge device, wherein the tag bridge device, when plugged in to a port of the endpoint device, relays the at least one command from the tag to the endpoint device.

20 Claims, 10 Drawing Sheets

(56) References Cited

U.S. PATENT DOCUMENTS

| | | | |
|---|---|---|---|
| 2020/0178906 A1* | 6/2020 | Bevan | A61B 5/02055 |
| 2021/0012073 A1* | 1/2021 | Suko | G06K 19/0723 |
| 2022/0077895 A1* | 3/2022 | Harney | H01Q 7/00 |
| 2022/0108092 A1* | 4/2022 | Wan | G06K 7/10079 |

OTHER PUBLICATIONS

Infineon Technologies, "NAC1080," https://www.infineon.com/cms/en/product/power/contactless-power-sensing-ics/nfc-tag-side-controllers/nac1080/, Accessed Jul. 5, 2023, 15 pages.

L. Rousseau et al., "PCSC-Tools," https://pcsc-tools.apdu.fr/, Jan. 2023, 5 pages.

Apple Inc., "Building an NFC Tag-Reader App," https://developer.apple.com/documentation/corenfc/building_an_nfc_tag-reader_app, Accessed Jul. 6, 2023, 7 pages.

NXP Semiconductors, "NTAG 5 Boost: NFC Forum-Compliant I²C Bridge for Tiny Devices," https://www.nxp.com/products/rfid-nfc/nfc-hf/connected-nfc-tags/ntag-5-boost-nfc-forum-compliant-ic-bridge-for-tiny-devices:NTAG5-BOOST, Accessed Jul. 5, 2023, 7 pages.

Digikey, "NXP USA Inc. NTP53121G0JHKZ," https://www.digikey.nl/en/products/detail/nxp-usa-inc/NTP53121GOJHKZ/11691250, Accessed Jul. 6, 2023, 5 pages.

Android Developers, "NFC Basics," https://developer.android.com/guide/topics/connectivity/nfc/nfc, Mar. 9, 2022, 26 pages.

Marek Mleziva, "Small Control Systems," https://www.emar.cz/USB_I2CEn.php, Accessed Jul. 3, 2023, 1 page.

Future Electronics, "NFC/I2C Tag ICs Combine Long Range with High-Speed Data Transfer," https://www.futureelectronics.com/ftm/connectivity/stmicroelectronics-st25dv-i2c-dynamic-tag-ics/, Nov. 10, 2022, 4 pages.

NXP Semiconductors, "NTAG 5 Development Kits," https://www.nxp.com/products/rfid-nfc/nfc-hf/connected-nfc-tags/ntag-5-development-kits:OM2NTX5332, Accessed Jul. 6, 2023, 6 pages.

U.S. Appl. No. 18/326,367 filed in the name of Jeroen Mackenbach et al. on Mar. 31, 2023, and entitled "System and Method for Management of Secured Devices."

* cited by examiner

| TECHNICAL ASPECT | ISO14443A | ISO14443B | ISO15693 | COMMENTS |
|---|---|---|---|---|
| ORIGINS | ~1990 | ~1995 | ~2001 | ISO14443B HAS A NUMBER OF ADVANTAGES RELATIVE TO ISO14443A |
| DATA RATE | 106Kbs | 106 TO 847Kbs | 1.64/26.4Kbs | ISO14443B IS ADAPTABLE TO APPLICATION SPEED REQUIREMENTS, AND SUPPORTS NEGOTIATION OF HIGHER DATA RATES |
| ANTI-COLLISION | MEDIUM (BINARY SEARCH TREE WITH INEFFICIENCIES) | EXCELLENT (SLOTTED-ALOHA WITH DYNAMIC SLOT ADAPTATION BY READER) | EXCELLENT (SLOTTED DETERMINISTIC CONCEPT) | SLOTTED ALOHA IS MORE EFFICIENT AND SOPHISTICATED THAN BINARY SEARCH TREE |
| MULTI-APPLICATIONS | YES – MEDIUM | YES – FAST | YES – SLOW | NO CLOCK RECOVERY IS REQUIRED FOR ISO14443B FOR MULTI-APPLICATIONS |
| MODULATION DEPTH | 100% (NO DATA PROCESSING DURING OFF PULSES) | 10% (DATA PROCESSING DURING OFF PULSES) | 100% AND 10% | 100% MODULATION MAY OFFER GREATER NOISE IMMUNITY FOR LONG READ-RANGE APPLICATIONS (>0.5-1m), BUT HAS NO DIFFERENCE FOR SMALL READ-RANGE APPLICATIONS (<0.1m) |
| AIR INTERFACE COMPLEXITY | LOW (ONLY 100%) | LOW (ONLY 10%) | MEDIUM (10% AND 100%) | LIMITED DIFFERENCES IN AIR INTERFACE COMPLEXITY WHEN USING FIXED DEPTHS OF MODULATION |

FIG. 4

MANAGEMENT OF ENDPOINT DEVICES UTILIZING TAG BRIDGE DEVICES

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for management of endpoint devices utilizing tag bridge devices for facilitating read and write of data to tags to be read by endpoint devices to which the tag bridge devices are connected.

In one embodiment, an apparatus comprises at least one processing device comprising a processor coupled to a memory. The at least one processing device is configured to receive, over a first communication channel from an orchestrator entity, at least one command specifying one or more actions to take involving an endpoint device, the one or more actions comprising at least one of writing data to a tag of a tag bridge device and reading data from the tag of the tag bridge device. The at least one processing device is further configured to relay the at least one command to the tag of the tag bridge device over a second communication channel, the second communication channel being established between a tag interface of the at least one processing device and the tag bridge device, wherein the tag bridge device, when plugged in to a port of the endpoint device, relays the at least one command from the tag to the endpoint device.

These and other illustrative embodiments include, without limitation, methods, apparatus, networks, systems and processor-readable storage media.

BRIEF DESCRIPTION OF THE DRAWINGS

FIG. 4 shows a table illustrating characteristics of different tag protocols in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
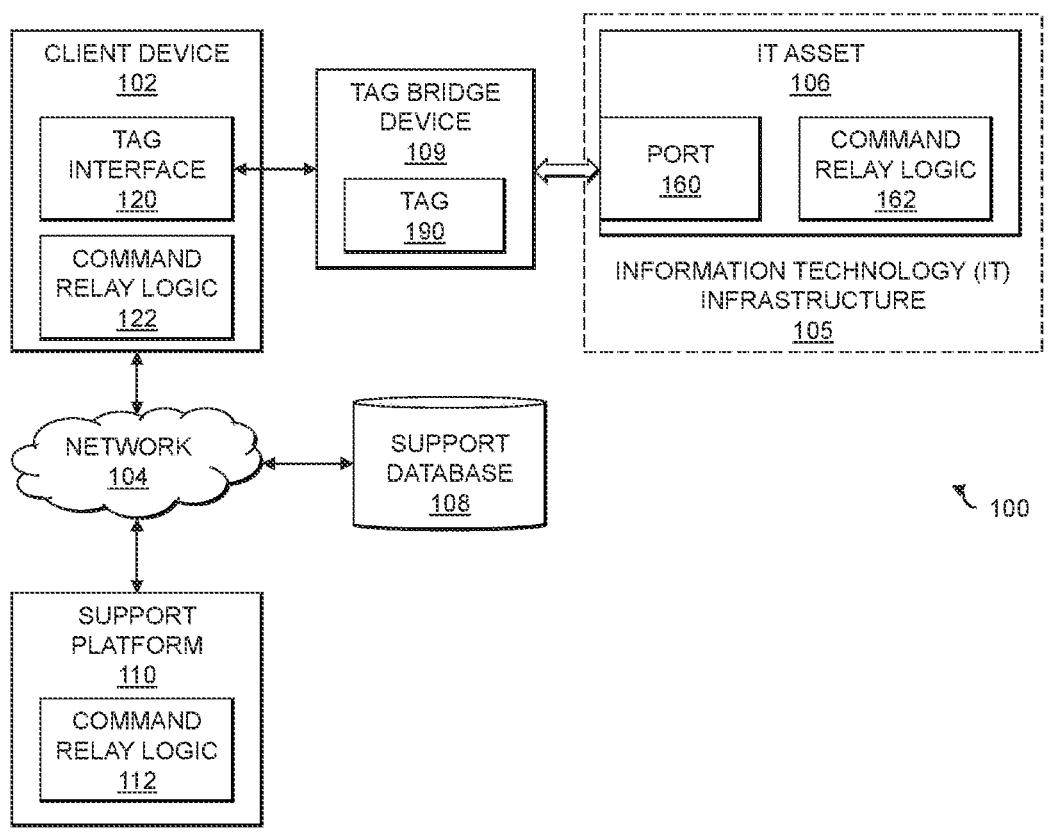
FIG. 1 is a block diagram of an information processing system configured for management of endpoint devices utilizing tag bridge devices for facilitating read and write of data to tags to be read by endpoint devices to which the tag bridge devices are connected in an illustrative embodiment.

FIG. 1 shows an information processing system 100 configured in accordance with an illustrative embodiment. The information processing system 100 is assumed to be built on at least one processing platform and provides functionality for management of endpoint devices utilizing tag bridge devices for facilitating read and write of data to tags to be read by endpoint devices to which the tag bridge devices are connected. The information processing system 100 includes a client device 102 which is coupled to a network 104. Also coupled to the network 104 is a support database 108 and a support platform 110. The client device 102 is further configured for communication with an information technology (IT) asset 106 of an IT infrastructure 105. Here, it is assumed that the IT asset 106 is at a "dark" site, with limited or no connectivity to the support platform 110. The IT asset 106 is assumed to comprise a physical computing resource in the IT infrastructure 105. The physical computing resource may include physical hardware such as servers, storage systems, networking equipment, Internet of Things (IoT) devices, other types of processing and computing devices including desktops, laptops, tablets, smartphones, etc. The physical computing resource may run one or more virtual computing resources, such as virtual machines (VMs), containers, etc.

In some embodiments, the support platform 110 is used for an enterprise system. For example, an enterprise may subscribe to or otherwise utilize the support platform 110 for managing the IT asset 106 (and other IT assets) of the IT infrastructure 105 operated by that enterprise. Users of the enterprise (e.g., software developers, test engineers or other employees, customers or users which may be associated with different ones of the client devices 102) may utilize the support platform 110 to configure or re-configure the IT asset 106, to troubleshoot and remediate issues encountered on the IT asset 106, etc. As used herein, the term "enterprise system" is intended to be construed broadly to include any group of systems or other computing devices. For example, the IT infrastructure 105 may provide a portion of one or more enterprise systems. A given enterprise system may also or alternatively include one or more client devices including the client device 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client device 102 may comprise, for example, a physical computing device such as an IoT device, a mobile telephone, a laptop computers, a tablet computer, or another type of device utilized by one or more members of an enterprise, in any combination. Such devices are examples of what are more generally referred to herein as "processing devices." Some of these processing devices are also generally referred to herein as "computers." The client device 102 may also or alternately comprise virtualized computing resources, such as VMs, containers, etc.

The client device 102 in some embodiments comprises a computer associated with a particular company, organization or other enterprise. Thus, the client device 102 may be considered an example of an asset of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The support database 108 is configured to store and record various information that is utilized by the support platform 110 for managing the IT asset 106 of the IT infrastructure 105. Such information may include, for example, identifying information for IT assets including the IT asset 106 (e.g., public keys or other information which may be used to validate the identity of IT assets), configuration information for IT assets including the IT asset 106, issues and associated remedial actions for resolving the issues, etc. In some embodiments, one or more of storage systems utilized to implement the support database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

In some embodiments, the client device 102 is assumed to be associated with a system administrator, IT manager or other authorized personnel responsible for managing IT assets of the IT infrastructure 105 including the IT asset 106. For example, the client device 102 may be operated by a user to relay commands from the support platform 110 to the IT asset 106. To do so, the client device 102 may utilize a tag interface 120 to read/write data to a tag 190 of a tag bridge device 109 which is plugged in to a port 160 of the IT asset 106.

In some embodiments, the IT assets of the IT infrastructure 105, including the IT asset 106, are owned or operated by the same enterprise that operates the support platform 110 (e.g., where an enterprise such as a business provides support for the assets it operates). In other embodiments, the IT assets of the IT infrastructure 105, including the IT asset 106, may be owned or operated by one or more enterprises different than the enterprise which operates the support platform 110 (e.g., a first enterprise provides support for assets that are owned by multiple different customers, business, etc.). Various other examples are possible.

In some embodiments, the client device 102 and the IT asset 106 of the IT infrastructure 105 implement host agents that are configured for relaying commands from the support platform 110 to the IT asset 106, and for relaying information (e.g., related to a status of the IT asset 106, identifying information for the IT asset 106, etc.) from the IT asset 106 to the support platform 110. It should be noted that a "host agent" as this term is generally used herein may comprise an automated entity, such as a software entity running on a processing device. Accordingly, a host agent need not be a human entity.

The client device 102, the IT asset 106 and the support platform 110 in the FIG. 1 embodiment are each assumed to be implemented using at least one processing device. Each such processing device generally comprises at least one processor and an associated memory, and implements one or more functional modules or logic for controlling certain features of the client device 102, the IT asset 106 and the support platform 110. In the FIG. 1 embodiment, the support platform 110 implements command relay logic 112, which is configured to relay commands for managing the IT asset 106 via the client device 102. The client device 102 implements command relay logic 122, which is configured to receive commands from the support platform 110 which are intended for the IT asset 106, and for writing such commands to the tag 190 of the tag bridge device 109. The tag bridge device 109 may then be plugged in to the port 160 of the IT asset 106. The IT asset 106 implements command relay logic 162, which is configured to read commands written to the tag 190, and to execute such commands on the IT asset 106. The IT asset 106 may also utilize the command relay logic 162 to provide information back to the support platform 110. by writing such information to the tag 190. The command relay logic 122 of the client device 102 can read the information written to the tag 190 (e.g., utilizing the tag interface 120 and the tag bridge device 109), and then provide such information to the support platform 110 over the network 104.

At least portions of the command relay logic 112, the command relay logic 122 and the command relay logic 162 may be implemented at least in part in the form of software that is stored in memory and executed by a processor.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client device 102, the IT infrastructure 105, the support database 108 and the support platform 110 or components thereof (e.g., the IT asset 106, the command relay logic 112, the command relay logic 122 and the command relay logic 162) may be implemented on respective distinct processing platforms, although numerous other arrangements are possible. For example, in some embodiments at least portions of the support platform 110 and one or more of the client device 102, the IT infrastructure 105 and/or the support database 108 are implemented on the same processing platform. The client device 102 can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client device 102, the IT infrastructure 105, the IT asset 106, the support database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 9 and 10.

It is to be appreciated that these and other features of illustrative embodiments are presented by way of example only, and should not be construed as limiting in any way.

It is to be understood that the particular set of elements shown in FIG. 1 for management of the IT asset 106 utilizing the tag bridge device 109 for facilitating read and write of data to the tag 190 which may be associated with the IT asset 106 by plugging the tag bridge device 109 in to the port 160 of the IT asset 106 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
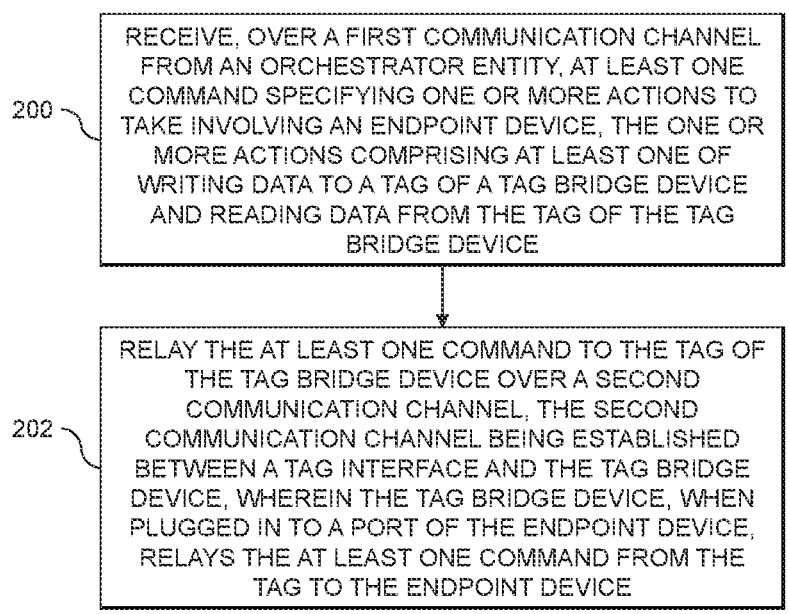
FIG. 2 is a flow diagram of an exemplary process for management of endpoint devices utilizing tag bridge devices for facilitating read and write of data to tags to be read by endpoint devices to which the tag bridge devices are connected in an illustrative embodiment.

An exemplary process for management of endpoint devices utilizing tag bridge devices for facilitating read and write of data to tags to be read by endpoint devices to which the tag bridge devices are connected will now be described in more detail with reference to the flow diagram of FIG. 2. It is to be understood that this particular process is only an example, and that additional or alternative processes for management of endpoint devices utilizing tag bridge devices for facilitating read and write of data to tags to be read by endpoint devices to which the tag bridge devices are connected may be used in other embodiments.

In this embodiment, the process includes steps 200 through 202. These steps are assumed to be performed by the client device 102, the IT asset 106 and the support platform 110 utilizing the command relay logic 112, the command relay logic 122 and the command relay logic 162. The process begins with step 200, receiving, over a first communication channel (e.g., network 104) from an orchestrator entity (e.g., support platform 110), at least one command specifying one or more actions to take involving an endpoint device (e.g., IT asset 106), the one or more actions comprising at least one of writing data to a tag (e.g., tag 190) of a tag bridge device (e.g., tag bridge device 109) and reading data from the tag of the tag bridge device. In step 202, the at least one command is relayed to the tag of the tag bridge device over a second communication channel, the second communication channel being established between a tag interface (e.g., tag interface 120) and the tag bridge device. The tag bridge device, when plugged in to a port of the endpoint device, relays the at least one command from the tag to the endpoint device.

The first communication channel may utilize a cellular radio access network.

The tag of the tag bridge device may comprise a Radio Frequency Identification (RFID) tag, a Near Field Communication (NFC) tag, etc.

The second communication channel may comprise an Inter-Integrated Circuit (I²C) communication interface. The port of the endpoint device may comprise a Universal Serial Bus (USB) port and the tag bridge device may comprise an I²C-to-USB bridge device. The tag bridge device may relay the at least one command from the tag to the endpoint device via an Inter-Integrated Circuit (I²C) Personal Computer/Smart Card (PCSC) interface of the endpoint device. The second communication channel may be established independent of an operating state of the tag bridge device, and the orchestrator entity may have no operable network connection with the endpoint device.

The at least one command may comprise first identifying information associated with the endpoint device, and the one or more actions may comprise verifying a location of the apparatus with respect to the endpoint device by: reading second identifying information from the tag, the second identifying information being written to the tag when the tag bridge device is plugged in to the port of the endpoint device; and verifying whether the second identifying information read from the tag of the tag bridge device matches the first identifying information included in the at least one command obtained from the orchestrator entity. The first identifying information and the second identifying information may comprise respective public keys.

The one or more actions specified in the at least one command may comprise performing recovery of the endpoint device by writing an instruction to the tag of the tag bridge device for modifying a configuration of the endpoint device from a first state to a second state. The second state may comprise a factory default state.

The one or more actions specified in the at least one command may comprise performing servicing of the endpoint device by writing an instruction to the tag of the tag bridge device for instantiating a service console on the endpoint device with one or more specified network parameters.

Illustrative embodiments provide technical solutions for configuration and servicing of endpoint devices used to provide various functionality. The hardware and/or software configuration of the endpoint devices may impact the functionality that is provided by the endpoint devices. For example, modifying a software configuration of an endpoint device may cause the endpoint device to provide different types of computer-implemented services. Likewise, changes in the hardware configuration of an endpoint device may similarly cause the endpoint device to provide different types of computer-implemented services. Changes in the software and/or hardware configuration of an endpoint device may, for example, impact the security posture of the endpoint device, the efficiency of the endpoint device in providing one or more computer-implemented services, etc.

In some cases, configuration of endpoint devices is managed using an orchestrator entity (e.g., an edge orchestrator). The orchestrator entity may be part of or be associated with a support platform that is responsible for maintaining the configuration of one or more endpoint devices. The orchestrator entity may do so through initiating performance of various actions on and/or by the endpoint devices. This can be facilitated through providing commands to the endpoint devices, either directly (e.g., when the endpoint devices are reachable via one or more networks) or indirectly via one or more facilitating devices (e.g., a smartphone or other type of mobile computing device which may be positioned near an endpoint device and which can relay commands from the orchestrator entity to that endpoint device). The orchestrator entity may also obtain information regarding endpoint devices (e.g., to make informed decisions regarding actions to be performed on and/or by the endpoint devices). Such information may be obtained directly (e.g., when the endpoint devices are reachable via one or more networks) or indirectly via one or more facilitating devices (e.g., a smartphone or other type of mobile computing device which may be positioned near an endpoint device and which can relay the obtained information from that endpoint device to the orchestrator entity). It should be noted that the facilitating device used to relay commands to a given endpoint device need not necessarily be the same facilitating device which obtains information from the given endpoint device. Further, it is possible for information to be obtained from the given endpoint device directly, and for commands to be relayed to the given endpoint device indirectly via one or more facilitating devices, or vice versa.

Figure 3:
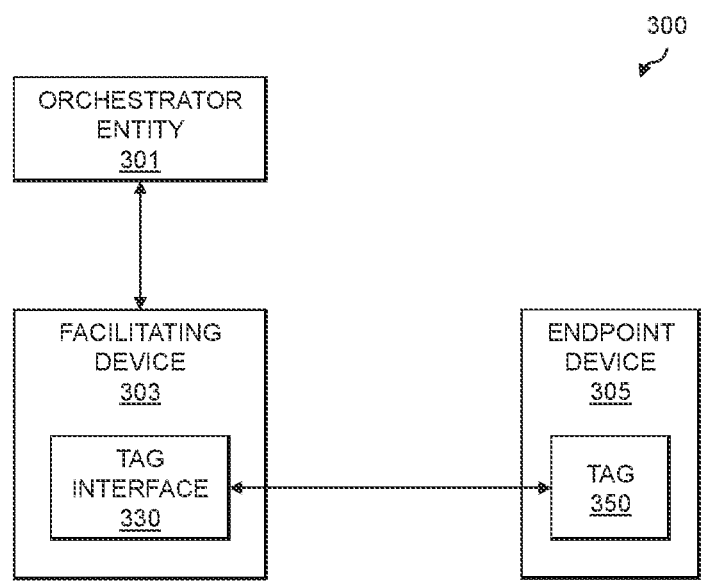
FIG. 3 shows a system for relaying commands from an orchestrator entity to an endpoint device via a facilitating device in an illustrative embodiment.

FIG. 3 shows a system 300, including an orchestrator entity 301, a facilitating device 303, and an endpoint device 305. In the system 300, the orchestrator entity 301 relays command to the endpoint device 305 via the facilitating device 303. To do so, the facilitating device 303 uses a tag interface 330 to write the relayed commands to a tag 350 of the endpoint device 305. It should be noted that the endpoint device 305 may be or may have been associated with multiple tags. The tag 350 thus may be a single tag, or a group of multiple tags which are associated with the endpoint device 305. The facilitating device 303 is operably connected to the orchestrator entity 301 (e.g., an edge orchestrator) via one or more wireless networks, such as one or more radio access networks (RANs), which can improve the reliability of connectivity for endpoint devices (e.g., such as endpoint device 305) in various locations.

The facilitating device 303 is configured with a tag interface 330, which may comprise a near field communication (NFC) or other type of radiofrequency identification (RFID) reader, such that when the facilitating device 303 is proximate to the endpoint device 305, NFC (or RFID) technology may be used to read and/or write data to the tag 350 (e.g., one or more NFC, RFID or other types of tags) of the endpoint device 305. In some embodiments, the use of NFC technology for a communication channel between the tag interface 330 of the facilitating device 303 and the tag 350 of the endpoint device 305 limits the likelihood of the endpoint device 305 being compromised, as the surface area for attack is limited (e.g., as close proximity is required for communication using NFC technology).

The endpoint device 305 may read and process data written to the tag 350, and can also store data in the tag 350 which may be read by the tag interface 330 of the facilitating device 303. Thus, the facilitating device 303 provides an efficient way to relay information between the orchestrator entity 301 and the endpoint device 305, including in situations in which the endpoint device 305 is "offline." There is no need to establish a general-purpose operable connection between the facilitating device 303 and the endpoint device 305. Instead, data may be read and/or written to storage of the tag 350 of the endpoint device 305—the endpoint device 305 does not even need to be active or powered on when data is read from or written to the tag 350 by the facilitating device 303. The endpoint device 305 can process data written to the tag 350 at a later time when it is convenient to do so. In some cases, the endpoint device 305 may periodically check the tag 350 for newly written data (e.g., which may include commands relayed from the orchestrator entity 301), or may check its tag 350 for newly written data on receiving a notification from the tag 350 indicating the presence of unread data, etc.

The technical solutions described herein thus provide various technical advantages, including addressing the technical problems of management of distributed systems with limited connectivity. The tag 350, for example, may be used to relay information between the orchestrator entity 301 and the endpoint device 305 which are not operably connected to each other. Thus, the endpoint device 305 may be remotely managed even while positioned at a "dark" site (e.g., with limited or no Internet or other network connectivity). In some cases, it is desired for the endpoint device 305 to be in a dark site for security reasons (e.g., to prevent or reduce the likelihood of a malicious user gaining access to the endpoint device 305). When the endpoint device 305 does not have network access (e.g., due to being in a remote location, lack of infrastructure, for security reasons, etc.), it is difficult to manage the endpoint device 305. Thus, it is possible for the endpoint device 305 to enter into an undesired operating state (e.g., one in which one or more desired computer-implemented services are not provided or are not functioning as intended). The technical solutions described herein enable the endpoint device 305 to be remotely managed (e.g., to return the endpoint device 305 back to a desired operating state) even when the endpoint device 305 does not have network access.

The endpoint device 305 may be managed utilizing the facilitating device 303, which obtains one or more commands from the orchestrator entity 301 (e.g., an edge orchestrator) using a first channel (e.g., a RAN or other wireless network). The commands may specify a set of one or more actions to be performed on the endpoint device 305 (e.g., for configuring the endpoint device 305, for provisioning or setting up functionality of the endpoint device 305, for servicing the endpoint device 305, for troubleshooting or diagnosing one or more issues encountered on the endpoint device 305, etc.). The facilitating device 303 writes the obtained commands to the tag 350 (e.g., one or more NFC, RFID or other types of tags) of the endpoint device 305 using a second channel. A processor of the endpoint device 305 may read the commands, and perform one or more actions on the endpoint device 305 in accordance with the commands. It should be noted that the tag 350 of the endpoint device 305 may store the commands until they are read by the processor of the endpoint device 305, with the tag 350 being configured to store the commands regardless of the operating state of the processor of the endpoint device 305 (e.g., the commands may be written to the tag 350 regardless of whether the processor or more generally the endpoint device 305 is active and/or powered on).

As noted above, the commands may specify one or more actions to be performed on the endpoint device 305 for various purposes (e.g., configuration, provisioning, servicing, troubleshooting, etc.). The actions may include, but are not limited to, resetting the endpoint device 305, establishing a terminal console between the endpoint device 305 and another device (e.g., the facilitating device 303, the orchestrator entity 301, another data processing system, etc.), modifying network information for the endpoint device 305, validating a service tag for the endpoint device 305, providing identifying information for the endpoint device 305, etc. In some embodiments, the commands include security data which may be used to cryptographically verify an identity of the endpoint device 305, which may be used by the endpoint device 305 to verify that the commands were relayed by an authorized orchestrator entity, etc. It should be noted that the endpoint device 305 does not need to have any connection established with the orchestrator entity 301 for the commands to be written to the tag 350, nor does the endpoint device 305 need to have any connection established with the orchestrator entity 301 to perform the one or more actions specified by the commands.

The tag 350 of the endpoint device 305 may include one or more NFC, RFID or other types of tags. The tag 350 generally includes storage, low power electronics and other hardware which allows for data to be stored in the tag 350 even while its associated endpoint device 305 is powered down or otherwise not active or operating. A processor of the endpoint device 305 may use a bidirectional bus (e.g., an Inter-Integrated Circuit (I²C) bus) in order to read data stored in its associated tag 350 and/or to store data in its associated tag 350 for reading by other devices (e.g., the facilitating device 303). The facilitating device 303 implements the tag interface 330 which is configured for communicating with the tag 350 of the endpoint device 305, such as using a wireless communication channel that complies with one or more standards such as International Organization for Standardization (ISO) 14443, ISO 15693, ISO 18000-3, EPCglobal, ISO 24730, ISO/International Electrotechnical Commission (IEC) 14442A/B, FeliCa, etc. The tag interface 330 of the facilitating device 303 and the tag 350 of the endpoint device 305 may implement a read-write protocol through which the facilitating device 303 writes data to the tag 350 and reads data from the tag 350. The tag interface 330 of the facilitating device 303 may be implemented using a chipset or other hardware which supports RFID and/or NFC communication technologies.

The facilitating device 303 may host an agent of the orchestrator entity 301, where the agent is configured to queue commands and/or other communications from the orchestrator entity 301 that are directed to the endpoint device 305. The agent uses the tag interface 330 of the facilitating device 303 to store data in and retrieve data from the tag 350 associated with the endpoint device 305, to process data obtained from the tag 350 associated with the endpoint device 305, and to provide the processed data to the orchestrator entity 301. The facilitating device 303 and the orchestrator entity 301 may be configured for communication over a communication channel including a RAN link. The RAN link may be supported by, for example, a cellular communication carrier that ties their RAN to the Internet or other networks.

When in range of the tag 350 associated with the endpoint device 305, the facilitating device 303 may write commands or other data structures to the storage of the tag 350. A processor of the endpoint device 305 may then obtain the commands or other data structures from the tag 350 for processing. Such processing may include verification of the commands or other data structures (e.g., checking signatures or other types of cryptographic data), performing one or more actions specified by the commands or other data structures, etc. As the tag 350 may operate independently of the processor of the endpoint device 305, the endpoint device 305 does not need to be operational for data from the facilitating device 303 to be stored in the tag 350. The processor of the endpoint device 305 may read and process the commands or other data structures stored in its tag 350 when it is convenient to do so.

The orchestrator entity 301 may send commands to the endpoint device 305 via the facilitating device 303, where the commands include instructions for one or more actions to take on the endpoint device 305. Such actions may include, for example, performing a recovery (e.g., reconfiguring the endpoint device 305 to a default configuration or last healthy state), operably connecting the endpoint device 305 to another device, using certain network information (e.g., an IP address) in communications with another device, performing verification operations (e.g., service tag verifications through which an identity of the endpoint device 305 may be verified), etc.

When in range of the tag 350 associated with the endpoint device 305, the facilitating device 303 may write commands (relayed from the orchestrator entity 301) to the storage of the tag 350. The facilitating device 303 may do so regardless of an operational state of the endpoint device 305, and use NFC, RFID, etc. Once the commands are written to the storage of the tag 350, the endpoint device 305 may read the commands from the tag 350 (e.g., when the endpoint device 305 is powered on or operational, it may check its tag 350 for newly-written data including any commands stored therein by the facilitating device 303). Before executing the commands, the endpoint device 305 may perform authentication of the commands. For example, cryptographic data in the commands may be used to verify that the commands were relayed from an authorized orchestrator entity 301. Such verification may use a chain or certificates that define delegations of authority from a root of trust of the endpoint device 305 to the orchestrator entity 301 which issued the command.

The facilitating device 303 may also read data from the tag 350 associated with the endpoint device 305. For example, the facilitating device 303 may execute a presence check request (e.g., received from the orchestrator entity 301) in order to validate presence of the endpoint device 305 with respect to the facilitating device 303. In response to the presence check request, the facilitating device 303 may perform a read of tags of endpoint devices which are within range of the facilitating device 303, and may relay data read from the tags of such endpoint devices to the orchestrator entity 301. Such data may include, but is not limited to, validation data (e.g., a signature or other cryptographic data such as a public key usable for verifying an identity of an endpoint device). It should be noted that the validation data may have been written to the tags of the endpoint device at any previous time by any entity (e.g., the orchestrator entity 301, the same or a different facilitating device 303, a service at a manufacturing site of the endpoint devices, combinations thereof, etc.). Once the data is read from the tag 350 of the endpoint device 305 by the facilitating device 303, the facilitating device 303 may check the content of the data in order to determine whether the data is for the particular endpoint device 305 for which the presence check is being performed. This may be done by comparing public keys or other validation data received from the tag 350 with corresponding data included in the presence check request. Based on this comparison, the facilitating device 303 may indicate to the orchestrator entity 301 issuing the presence check request whether the endpoint device 305 is within range of the facilitating device 303. The facilitating device 303 may also or alternatively forward data read from the tag 350 to the orchestrator entity 301 (e.g., status data for the endpoint device 305, which may be used by the orchestrator entity 301 to select appropriate commands to be relayed to the endpoint device 305).

In some embodiments, the endpoint device 305 may lack human interface devices. For example, the endpoint device 305 may not include a display, a mouse or other type of pointing device, a keyboard, etc. The endpoint device 305, for example, may be an edge device positioned at a remote location (e.g., with respect to a data center environment in which the orchestrator entity 301 such as an edge orchestrator is positioned) and may not include any local human interface devices. A technician or other support personnel may carry and utilize the facilitating device 303 to relay commands or data between the orchestrator entity 301 and the endpoint device 305 when the facilitating device 303 is proximate thereto (e.g., for maintenance or other purposes).

In some embodiments, the technical solutions described herein address the usability of RFID or other types of tags, mobile phones and cellular technology to enable interaction with compute end nodes (e.g., endpoint devices) in a disconnected environment in a secure and easy way. Serviceability in dark sites presents various technical challenges, and customers or other end-users want to assure there is trust between parties. As many edge cases have less trained IT staff, it is challenging to do service when customers or other end-users, for example, do not want to give console access to such untrained staff. Such staff typically carries smartphones or other mobile computing devices (e.g., which typically run Android or iOS), and thus allow service technicians to be in reach of a managed control plane via cellular connections (e.g., 4G or 5G connections) of the mobile computing devices.

In many cases, traditional ways of intervention like Secure Shell (SSH) or other terminal connections, keyboard access, etc. are not desirable or available. RFID has reached a level of maturity where almost every mobile computing device, including almost all smartphones, carries an RFID reader and a way of interacting with a variety of tags. The main worldwide accepted high frequency RFID air interface and protocol standards (e.g., since the mid to late 1990s) include ISO14443 and ISO15693. ISO14443 includes Type A (ISO14443A) and Type B (ISO14443B). FIG. 4 shows a table 400 illustrating various characteristics of the ISO14443A, ISO14443B and ISO15693 standards, including data rate, anti-collision features, multi-application features, modulation depth, and air interface complexity. ISO15693 is primarily used for vicinity applications, including access control, asset tracking, portable data storage, etc. ISO15693 is logically divided into three parts—ISO15693-1: Physical Characteristics of Cards (VICCs), ISO15693-2: Air Interface and Initialization, and ISO15693-3: Anti-Collision and Transmission Protocol. ISO/IEC 18000-3 is a medical application version of ISO15693.

RFID tags have evolved and are at a level where there is a possibility of having two interfaces, where both "wired" and "wireless" interaction are possible. As an example, the STMicroelectronics ST25DV-I$^2$C, Infineon NAC1080 and NXP NTAG5 series of tags including dynamic and dual NFC/RFID and I$^2$C interfaces, and can be used in a wide variety of applications including consumer electronics, industrial, metering, electronic shelf labels, IoT objects, etc.

Figure 5:
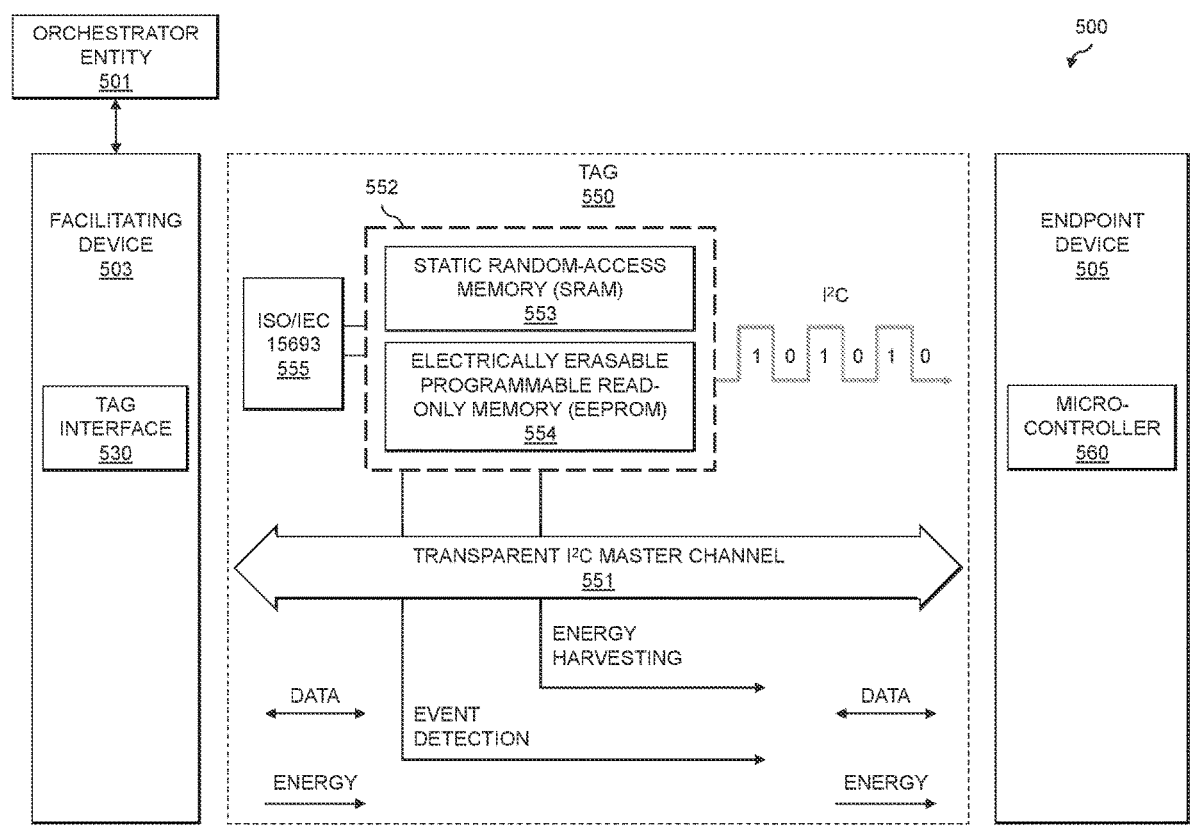
FIG. 5 shows a system for relaying commands from an orchestrator entity to an endpoint device via a facilitating device over a communication channel comprising a bi-directional communication interface in an illustrative embodiment.

FIG. 5 shows a system 500 including an orchestrator entity 501 in communication with a facilitating device 503 implementing a tag interface 530. The tag interface 530 is used to communicate with a tag 550 associated with an endpoint device 505. The tag 550 is illustratively a dynamic RFID tag, providing a transparent I$^2$C master channel 551, and includes storage 552 comprising static random-access memory (SRAM) 553 and electrically erasable programmable read-only memory (EEPROM) 554. The tag 550 in this embodiment utilizes the ISO/IEC15693 standard 555. The transparent I$^2$C master channel 551 provides functionality for event detection and energy harvesting, and allows data exchange to and from the facilitating device 503 and the tag 550, and from the tag 550 to the endpoint device 505 (e.g., to a microcontroller (MCU) 560 thereof). The transparent I$^2$C master channel 551 also allows for energy transfer (e.g., from the tag interface 530 to the tag 550).

Figure 6:
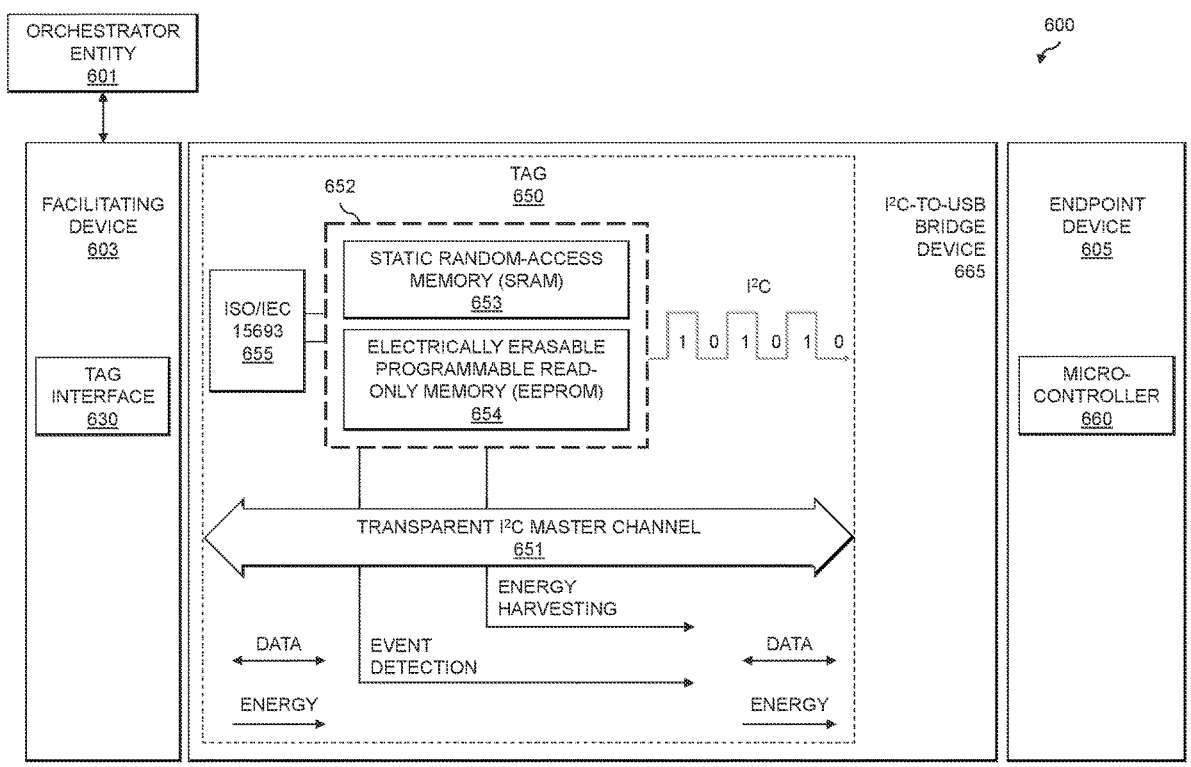
FIG. 6 shows a system for relaying commands from an orchestrator entity to an endpoint device via a facilitating device over a communication channel comprising a bi-directional communication interface between a tag interface of the facilitating device and a tag bridge device plugged into a port of the endpoint device in an illustrative embodiment.

In some cases, an endpoint device may not include any tag which may be used for relaying commands from an orchestrator entity via a facilitating device. In such cases, a bridge device incorporating a tag may be used to interface with an endpoint device (e.g., by plugging the bridge device into a port of the endpoint device). The bridge device may comprise, for example, an I$^2$C-to-USB bridge device configured for plugging in to a USB port of an endpoint device. FIG. 6 shows a system 600 including an orchestrator entity 601, a facilitating device 603 implementing a tag interface 630, and an I$^2$C-to-USB bridge device 665 incorporating a tag 650. The tag 650 is illustratively a dynamic RFID tag, providing a transparent IC master channel 651, and includes storage 652 comprising SRAM 653 and EEPROM 654. The tag 650 in this embodiment utilizes the ISO/IEC15693 standard 655. The transparent IC master channel 651 provides functionality for event detection and energy harvesting, and allows data exchange to and from the facilitating device 603 and the tag 650, and from the tag 650 to the endpoint device 605 (e.g., to a MCU 660 thereof). The transparent I²C master channel 651 also allows for energy transfer (e.g., from the tag interface 630 to the tag 650). The I²C-to-USB bridge device 665 is incorporated between the transparent I²C master channel 651 and the MCU 660 of the endpoint device 605. The I²C-to-USB bridge device 665 may be implemented using a circuit board with a MCP2221 USB-to-UART/I²C converter. For example, the IC-to-USB bridge device 665 may be embodied as a USB stick device which is carried by a user of the facilitating device 603. When the user of the facilitating device 603 is seeking to relay commands from the orchestrator entity 601 to the endpoint device 605, the user can plug the I²C-to-USB bridge device 665 into a USB port of the endpoint device 605. The user can un-plug the IC-to-USB bridge device 665 from the USB port of the endpoint device 605 after successful relay of commands from the orchestrator entity 601 to the endpoint device 605 via the tag 650, after successful read of information from the endpoint device 605 via the tag 650, etc.

Edge devices are typically exposed to a higher attack surface than traditional IT datacenter workloads or client platforms. One reason for this is that there is often no (or insufficient) IT staff available. Further, in many cases edge devices are situated in a loosely connected off-premises location. The need of interacting with often "headless" edge or other endpoint devices in dark sites is challenging.

Figure 7:
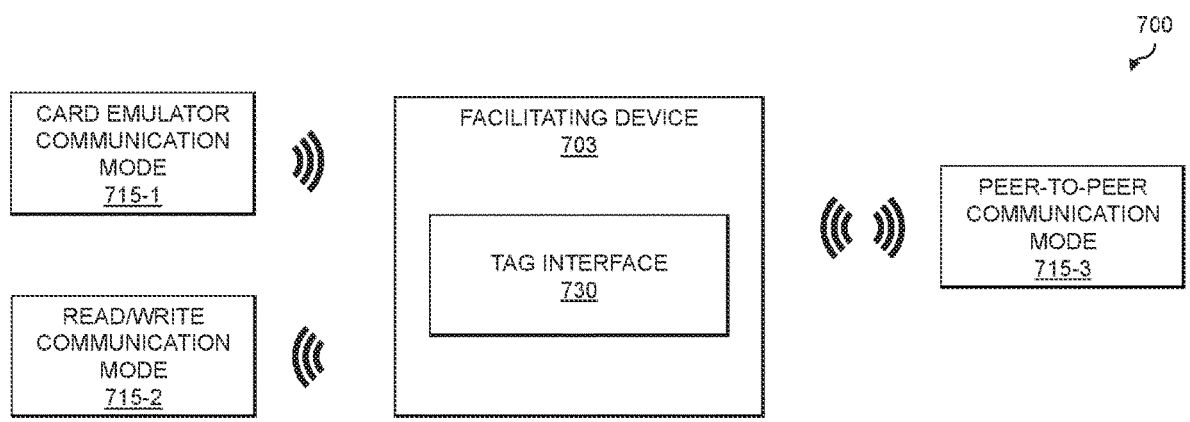
FIG. 7 shows communication modes for a tag interface of a facilitating device in an illustrative embodiment.

FIG. 7 shows a system 700 illustrating RFID modes of operation and communication which may be implemented by a facilitating device 703 with a tag interface 730 (e.g., an NFC or other RFID interface or reader). The different operating and communication modes include a card emulator communication mode 715-1 and a read/write communication mode 715-2, which are both passive operating modes, as well as a peer-to-peer communication mode 715-3 which is an active operating mode. The traditional way of interchange or communication between RFID tags is the peer-to-peer communication mode 715-3, which is not well supported on both tags and standards. Illustrative embodiments provide technical solutions for utilizing the read/write communication mode 715-2, which is well established and supported both from the host as well as from the radio side. The peer-to-peer communication mode 715-3 needs an active link establishment, but the read/write communication mode 715-2 is advantageously a passive operating mode.

The peer-to-peer communication mode 715-3 has various limitations, and is not well supported on all mobile computing devices. For example, the peer-to-peer communication mode 715-3 has only recently been introduced as an option on the iPhone 14 in February 2022. Some smartphones running the Android platform also support the peer-to-peer communication mode 715-3. The technical solutions described herein rely on a simpler concept than the peer-to-peer communication mode 715-3. The endpoint devices look like and implement a simple NFC "tag" interface, which is well supported on most modern and slightly older smartphones and other mobile computing devices.

Illustrative embodiments provide technical solutions for creating a way of invoking tasks from an orchestrator entity (e.g., an edge orchestrator) to endpoint devices (e.g., edge endpoints) in a secure way without traditional interactivity through a console or a human interface device such as a keyboard. The technical solutions provide a novel approach, in that the traditional way of interchanging between RFID tags would be the peer-to-peer communication mode which is not well supported on both tags and standards. Thus, technical solutions use traditional read/write operations from the tag which is well established and supported both from the host as well as from the radio side. Advantageously, the addition of an I²C-to-USB bridge allows a very easy way of adopting peer-to-peer RFID communications to any compute endpoint device and a facilitating device (e.g., a mobile phone). This also allows exchanging secrets with the USB device in an unpowered state.

Figure 8:
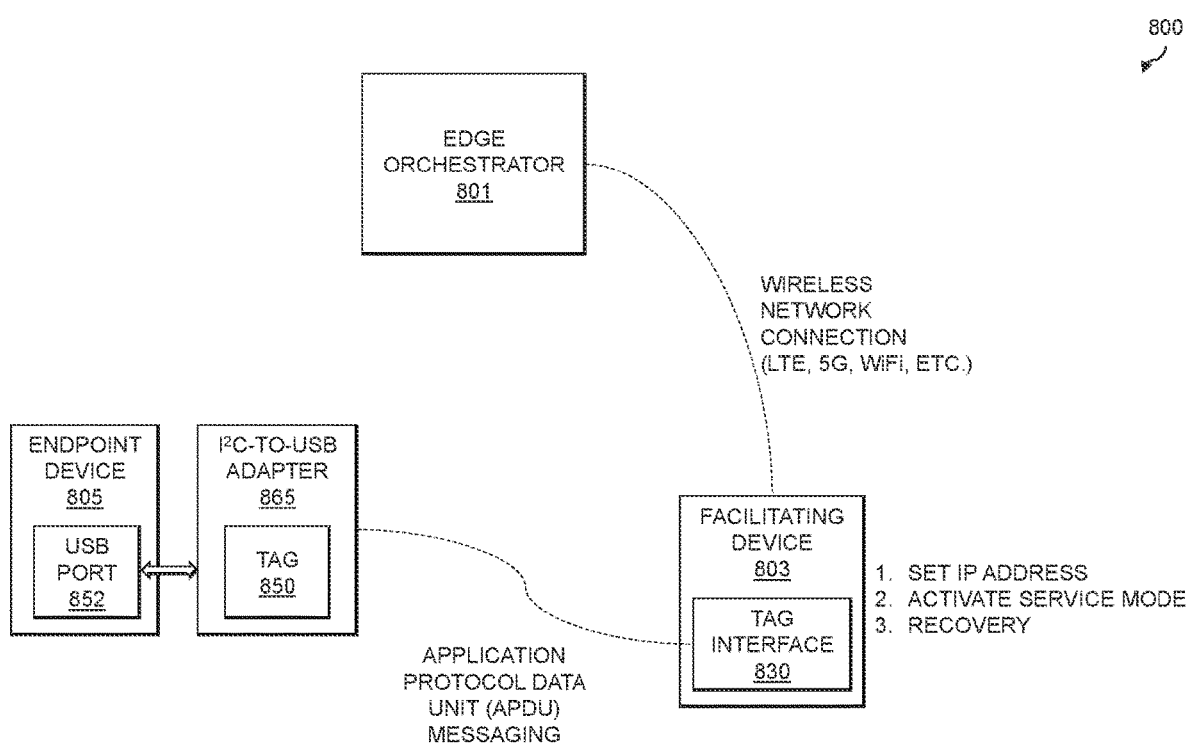
FIG. 8 shows a system for relaying commands from an edge orchestrator to an endpoint device via a facilitating device over a communication channel comprising an Inter-Integrated Circuit ($I^2C$) communication interface between a tag interface of the facilitating device and an $I^2C$-to-Universal Serial Bus (USB) bridge device plugged into a USB port of the endpoint device in an illustrative embodiment.

FIG. 8 shows a system 800, including an edge orchestrator 801 (e.g., an orchestrator entity), a facilitating device 803 (e.g., a mobile phone), and an endpoint device 805 (e.g., an edge device). The edge orchestrator 801 and the facilitating device 803 communicate via a wireless network connection, such as an LTE or 5G cellular connection, a WiFi connection, etc. The facilitating device 803 implements a tag interface 830 which is used for communication with a tag 850 of an I²C-to-USB adapter 865 which is plugged in to a USB port 852 of the endpoint device 805. The tag interface 830 and I²C-to-USB adapter 865 may communicate using application protocol data unit (APDU) messaging.

A process flow for actioning a given task from the edge orchestrator 801 to the endpoint device 805 while there is no direct connection between the edge orchestrator 801 and the endpoint device 805 available (e.g., where the endpoint device 805 is an edge device at a dark site, or has an ambiguous status). The interaction is thru a queued action from the edge orchestrator 801 which will be passed to the facilitating device 803 (e.g., a mobile phone or other mobile computing device carried by IT support staff for a data center or other computing site where the endpoint device 805 is located), where the facilitating device 803 is connected to a control plane (e.g., of the edge orchestrator 801) over a cellular or other type of wireless connection. An application on the facilitating device 803 is responsible for receiving the queued action from the control plane of the edge orchestrator 801. The application on the facilitating device 803 will pass the queue action through a swipe of the facilitating device 803 over the I²C-to-USB adapter 865, which is equipped with a multi-directional RFID tag (tag 850). This wireless interaction will allow NFC Data Exchange Format (NDEF) information to be transferred and picked up by the tag 850. The IC-to-USB adapter 865 can then transfer such information to the endpoint device 805 when it is plugged in to the USB port 852 thereof. At this stage, the tag 850 holds the queued action from the edge orchestrator 801. and this can be picked up by the endpoint device 805 through a Personal Computer/Smart Card (PCSC) interface. In this way, an application running on the endpoint device 805 will be able to pick up the queued action from the edge orchestrator 801 and service the request from the edge orchestrator 801.

Various scenarios for interactions between the edge orchestrator 801 and the endpoint device 805 will now be described. It should be noted that security mechanisms should be in place, and may depend on the chosen implementation.

Multi-factor authentication (MFA) and presence verification will now be described. From the edge orchestrator 801, a presence request is received at the facilitating device 803 in order to verify if a user of the facilitating device 803 is located near to the target endpoint device 805. The presence request will be sent to the user's facilitating device 803 (e.g., the user's smartphone) over a cellular or other wireless network connection. The facilitating device 803 receives a public key of the target endpoint device 805 from the edge orchestrator 801. The tag 850 of the I²C-to-USB adapter 865 may hold the public key of the endpoint device 805, which is received on the tag 850 over an I²C PCSC interface from the endpoint device 805. The facilitating device 803 will obtain the public key by swiping or otherwise passing or placing the facilitating device 803 in close proximity over the tag 850 of the I²C-to-USB adapter 865. The facilitating device 803 will be able to verify that the public key obtained from the tag 850 matches the public key received from the edge orchestrator 801 (e.g., by verifying if hashes of the public keys correspond to one another). This match could provide MFA validation to be communicated to the edge orchestrator 801, as the user of the facilitating device 803 is near to the endpoint device 805.

Recovery of the endpoint device 805 will now be described. Onboarding into a control plane of the edge orchestrator 801 may be used to perform recovery of the endpoint device 805. The facilitating device 803 may receive a request to recover the endpoint device 805 from the edge orchestrator 801 (e.g., RECOVER_STAG_12345XYZ). The recovery request is sent to the facilitating device 803 (e.g., of a service technician) which is on site with the endpoint device 805. The facilitating device 803 receives the recovery request from the edge orchestrator 801 of the target endpoint device 805 in question. The user of the facilitating device 803 can swipe or pass the facilitating device 803 over the tag 850 of the I²C-to-USB adapter 865 in order to write the recovery request to the tag 850. The I²C-to-USB adapter 865, when plugged in to the USB port 852 of the endpoint device 805, will pass the recovery request to the endpoint device 805. The endpoint device 805 can receive the recovery request from the tag 850 over an I²C PCSC interface. The endpoint device 805 will receive the message from the edge orchestrator 801 as RECOVER_STAG_12345XYZ. This allows the endpoint device 805 to do a full recovery (e.g., to factory default or another desired state).

Service console instantiation will now be described. Serviceability is one use case for interacting with endpoint devices which have become unresponsive to messages from the control plane of the edge orchestrator 801, or for endpoint devices which are not reachable from the control plane of the edge orchestrator 801. From the edge orchestrator 801, the facilitating device 803 gets a request to service the endpoint device 805 (e.g., INIT_SERVICE_12345XYZ). The service request is sent to the facilitating device 803 (e.g., of a service technician) which is on site with the endpoint device 805. The facilitating device 803 receives the service request from the edge orchestrator 801 of the target endpoint device 805 in question. The user of the facilitating device 803 can swipe or pass the facilitating device 803 over the tag 850 of the I²C-to-USB adapter 865 in order to write the service request to the tag 850. The I²C-to-USB adapter 865, when plugged in to the USB port 852 of the endpoint device 805, can pass the service request from the tag 850 to the endpoint device 805 over an I²C PCSC interface to the tag 850. The endpoint device 805 will receive the message from the edge orchestrator 801 as INIT_SERVICE_12345XYZ. This allows the endpoint device 805 to perform servicing. This may include, for example, entering a service mode which opens SSH to become available on a terminal console. This may also or alternatively include various other service tasks, such as setting an IP address, verifying a service tag, exchanging information acquired through a service interface.

An example of recovery will now be described with respect to use of a physical ISO14443-A smartcard, which can be used to verify reading and writing done from the card. In a recovery scenario, the read may be done from a PCSC daemon interface over I²C, which is part of the edge compute endpoint device.

The technical solutions described herein enable IT staff to use secure RFID interaction between a control plane (e.g., of an orchestrator entity) and edge compute endpoint devices to provide interactivity in a secure manner over a pluggable bridge device (e.g., a USB stick). The technical solutions thus allow automated interaction between the orchestrator entity and endpoint devices (e.g., which are offline, at dark sites, etc.) by using RFID technology, facilitated by bridging a facilitating device (e.g., a mobile phone) as an RFID reader and assignment router over a pluggable USB stick. The RFID mode used can be a passive operating mode rather than an active operating mode, which allows easy integration on the developer side. The USB stick (e.g., the tag bridge device) does not have to be powered or plugged in during secret injection to a tag thereof. The technical solutions are advantageously well supported by popular mobile operating systems such as iOS and Android. The technical solutions enable inexpensive components to be used as tag bridges to interact with compute endpoint devices and an orchestrator entity control plane. In some embodiments, a USB implementation is used for the tag bridge, which has a low cost and can be implemented with low productization effort.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for management of endpoint devices utilizing tag bridge devices for facilitating read and write of data to tags to be read by endpoint devices to which the tag bridge devices are connected will now be described in greater detail with reference to FIGS. 9 and 10. Although described in the context of system 100, these platforms may also be used to implement at least portions of other information processing systems in other embodiments.

Figure 9:
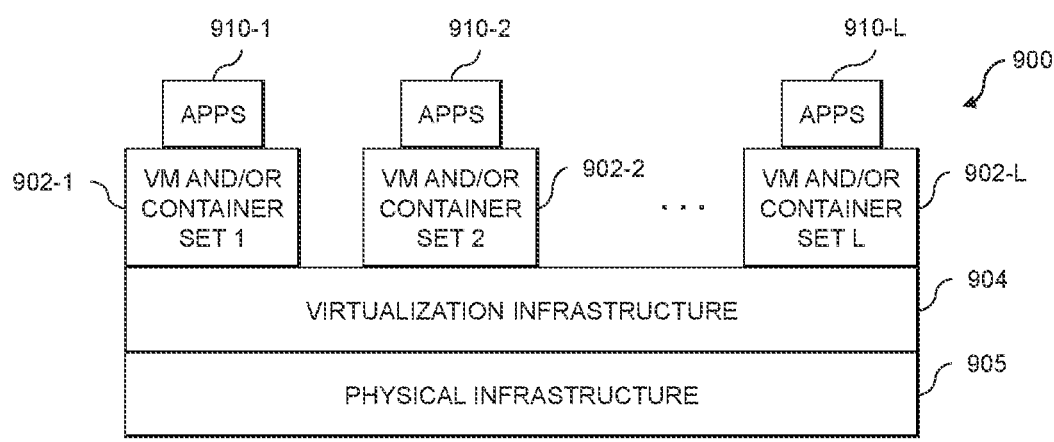
FIGS. 9 and 10 show examples of processing platforms that may be utilized to implement at least a portion of an information processing system in illustrative embodiments.
Figure 10:
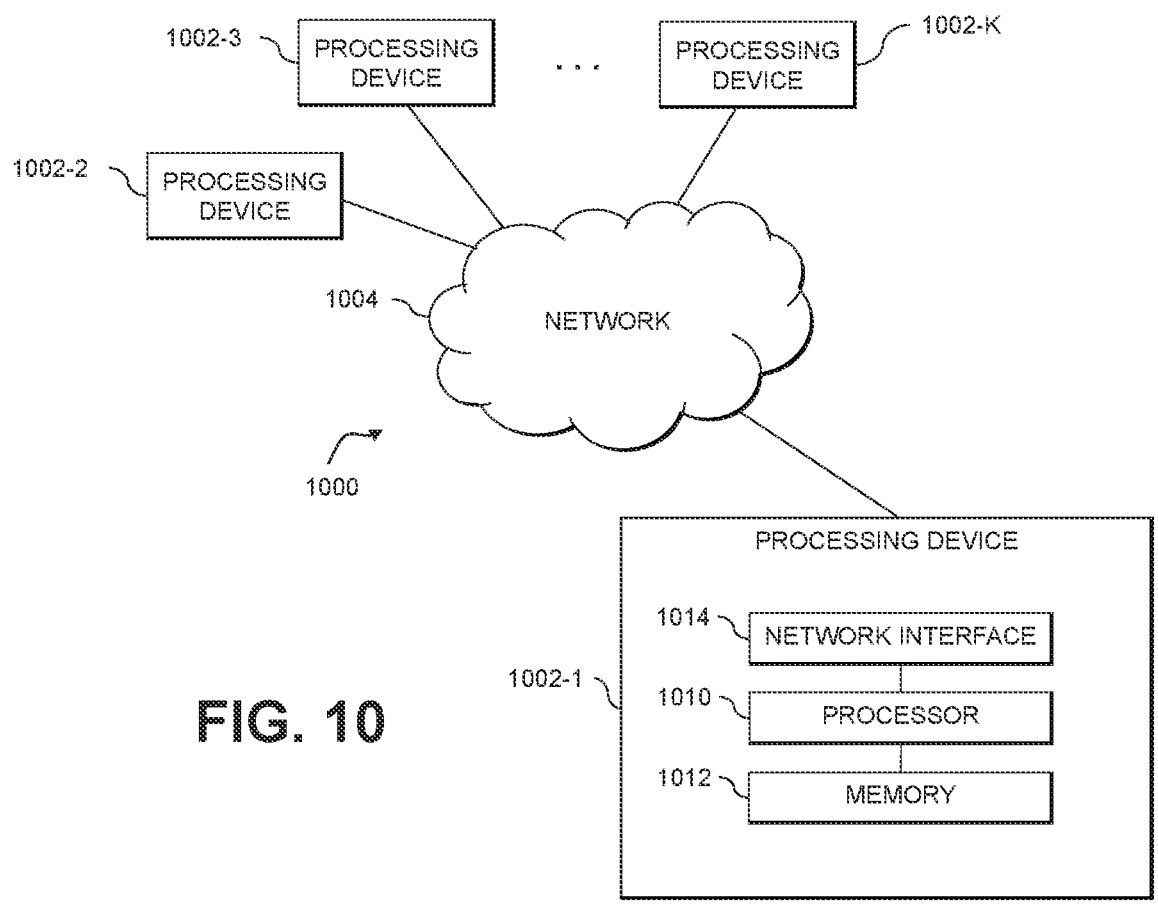

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for management of endpoint devices utilizing tag bridge devices for facilitating read and write of data to tags to be read by endpoint devices to which the tag bridge devices are connected as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to receive, over a first communication channel from an orchestrator entity, at least one command specifying one or more actions to take involving an endpoint device, the one or more actions comprising at least one of writing data to a tag of a tag bridge device and reading data from the tag of the tag bridge device, the first communication channel utilizing a wireless network connection;

to establish a second communication channel between a tag interface of the at least one processing device and the tag bridge device, the second communication channel utilizing a first type of wired interface; and to relay the at least one command to the tag of the tag bridge device over the second communication channel, wherein the tag bridge device, when plugged in to a port of the endpoint device, relays the at least one command from the tag to the endpoint device over a third communication channel, the third communication channel utilizing a second type of wired interface, the second type of wired interface being different than the first type of wired interface.

2. The apparatus of claim 1 wherein the first communication channel utilizes a cellular radio access network.

3. The apparatus of claim 1 wherein the tag of the tag bridge device comprises a Radio Frequency Identification (RFID) tag.

4. The apparatus of claim 1 wherein the tag of the tag bridge device comprises a Near Field Communication (NFC) tag.

5. The apparatus of claim 1 wherein the first type of wired interface comprises an Inter-Integrated Circuit ($I^2C$) communication interface.

6. The apparatus of claim 4 wherein the port of the endpoint device comprises a Universal Serial Bus (USB) port, the second type of wired interface comprises a USB interface, and the tag bridge device comprises an $I^2C$-to-USB bridge device.

7. The apparatus of claim 4 wherein the second type of wired interface comprises a Personal Computer/Smart Card (PCSC) interface, and wherein the tag bridge device relays the at least one command from the tag to the endpoint device via an $I^2C$ PCSC interface of the endpoint device.

8. The apparatus of claim 1 wherein the second communication channel is established independent of an operating state of the tag bridge device.

9. The apparatus of claim 1 wherein the orchestrator entity has no operable network connection with the endpoint device.

10. The apparatus of claim 1 wherein the at least one command comprises first identifying information associated with the endpoint device, and wherein the one or more actions comprise verifying a location of the apparatus with respect to the endpoint device by:

reading second identifying information from the tag, the second identifying information being written to the tag when the tag bridge device is plugged in to the port of the endpoint device; and verifying whether the second identifying information read from the tag of the tag bridge device matches the first identifying information included in the at least one command obtained from the orchestrator entity.

11. The apparatus of claim 10 wherein the first identifying information and the second identifying information comprise respective public keys.

12. The apparatus of claim 1 wherein the one or more actions specified in the at least one command comprise performing recovery of the endpoint device by writing an instruction to the tag of the tag bridge device for modifying a configuration of the endpoint device from a first state to a second state.

13. The apparatus of claim 12 wherein the second state comprises a factory default state.

14. The apparatus of claim 1 wherein the one or more actions specified in the at least one command comprise performing servicing of the endpoint device by writing an instruction to the tag of the tag bridge device for instantiating a service console on the endpoint device with one or more specified network parameters.

15. A computer program product comprising a non-transitory processor-readable storage medium having stored therein program code of one or more software programs, wherein the program code when executed by at least one processing device causes the at least one processing device:

to receive, over a first communication channel from an orchestrator entity, at least one command specifying one or more actions to take involving an endpoint device, the one or more actions comprising at least one of writing data to a tag of a tag bridge device and reading data from the tag of the tag bridge device, the first communication channel utilizing a wireless network connection;

to establish a second communication channel between a tag interface of the at least one processing device and the tag bridge device, the second communication channel utilizing a first type of wired interface; and to relay the at least one command to the tag of the tag bridge device over the second communication channel, wherein the tag bridge device, when plugged in to a port of the endpoint device, relays the at least one command from the tag to the endpoint device over a third communication channel, the third communication channel utilizing a second type of wired interface, the second type of wired interface being different than the first type of wired interface.

16. The computer program product of claim 15 wherein the second communication channel comprises an Inter-Integrated Circuit (I2C) communication interface.

17. The computer program product of claim 16 wherein the port of the endpoint device comprises a Universal Serial Bus (USB) port, the second type of wired interface comprises a USB interface, and the tag bridge device comprises an $I^2C$-to-USB bridge device.

18. A method comprising:

receiving, at a processing device over a first communication channel from an orchestrator entity, at least one command specifying one or more actions to take involving an endpoint device, the one or more actions comprising at least one of writing data to a tag of a tag bridge device and reading data from the tag of the tag bridge device, the first communication channel utilizing a wireless network connection;

establishing a second communication channel between a tag interface of the processing device and the tag bridge device, the second communication channel utilizing a first type of wired interface; and relaying the at least one command to the tag of the tag bridge device over the second communication channel, wherein the tag bridge device, when plugged in to a port of the endpoint device, relays the at least one command from the tag to the endpoint device over a third communication channel, the third communication channel utilizing a second type of wired interface, the second type of wired interface being different than the first type of wired interface.

19. The method of claim 18 wherein the second communication channel comprises an Inter-Integrated Circuit ($I^2C$) communication interface.

20. The method of claim 19 wherein the port of the endpoint device comprises a Universal Serial Bus (USB) port, the second type of wired interface comprises a USB interface, and the tag bridge device comprises an I$^2$C-to-USB bridge device.

\* \* \* \* \*